(12) United States Patent
Yu et al.

(10) Patent No.: US 8,240,058 B1
(45) Date of Patent: Aug. 14, 2012

(54) DROP TEST DEVICE

(75) Inventors: Meng-Bin Yu, Shenzhen (CN); Ming-Hui Luo, Shenzhen (CN); Yong Ma, Shenzhen (CN); Yu-Lin Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/195,008

(22) Filed: Aug. 1, 2011

(30) Foreign Application Priority Data

Apr. 15, 2011 (CN) .......................... 2011 1 0094635

(51) Int. Cl.
*G01D 21/00* (2006.01)
(52) U.S. Cl. ......................................................... 33/613
(58) Field of Classification Search ............... 33/366.11, 33/533, 1 BB, 613, 645, 551–556
See application file for complete search history.

(56) References Cited

U.S. PATENT DOCUMENTS

| | | | | |
|---|---|---|---|---|
| 3,713,643 A | * | 1/1973 | Gerstenberger | 493/405 |
| 6,862,817 B1 | * | 3/2005 | Lenox | 33/623 |
| 7,065,894 B2 | * | 6/2006 | Lenox | 33/623 |
| 7,340,843 B2 | * | 3/2008 | Zhang et al. | 33/533 |
| 7,743,525 B2 | * | 6/2010 | Zhang et al. | 33/533 |
| 8,046,931 B2 | * | 11/2011 | Zhang | 33/573 |
| 8,065,812 B2 | * | 11/2011 | Zhang | 33/533 |
| 2008/0155846 A1 | * | 7/2008 | Li et al. | 33/533 |

* cited by examiner

*Primary Examiner* — Yaritza Guadalupe-McCall
(74) *Attorney, Agent, or Firm* — Altis Law Group, Inc.

(57) ABSTRACT

A drop test device for testing any deviation between the gravity line of an object and a defined vertical orientation includes a dropping machine and a drop panel installed on the dropping machine. The drop panel includes a support board, a plurality of restriction boards fixed on the support board, a plurality of rollers mounted on the support board and a sliding board positioned on the plurality of rollers for supporting the object. The sliding board is positioned between the plurality of restriction boards and slides on the plurality of rollers. If the gravity line of the object is not on the same line as a supportive strength line of the object, the sliding board moves on the support board and triggers the plurality of restriction boards.

16 Claims, 5 Drawing Sheets

DROP TEST DEVICE

BACKGROUND

1. Technical Field

The present disclosure relates to drop test devices, and particularly to a drop test device for testing whether the gravity line of an object deviates from a defined vertical orientation.

2. Description of Related Art

Various electronic apparatuses, such as computers, are contained in a metal case. For example, a computer system is generally received in a computer enclosure, which is usually made of steel plate. When the computer enclosure is being transported, the computer enclosure may be dropped because of carelessness, and the corners are the most vulnerable portions. When a corner of a plate of a computer enclosure lands first, the corner is easily deformed and the computer system is damaged. Therefore, the corner of the plate should be strong enough to avoid deformation, and testing the strength of the corners of the plate is necessary. However, having the corner land first when the plate is being drop-tested is a hit or miss affair because it is difficult to maintain the enclosure in a particular orientation when it is being dropped.

Therefore there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
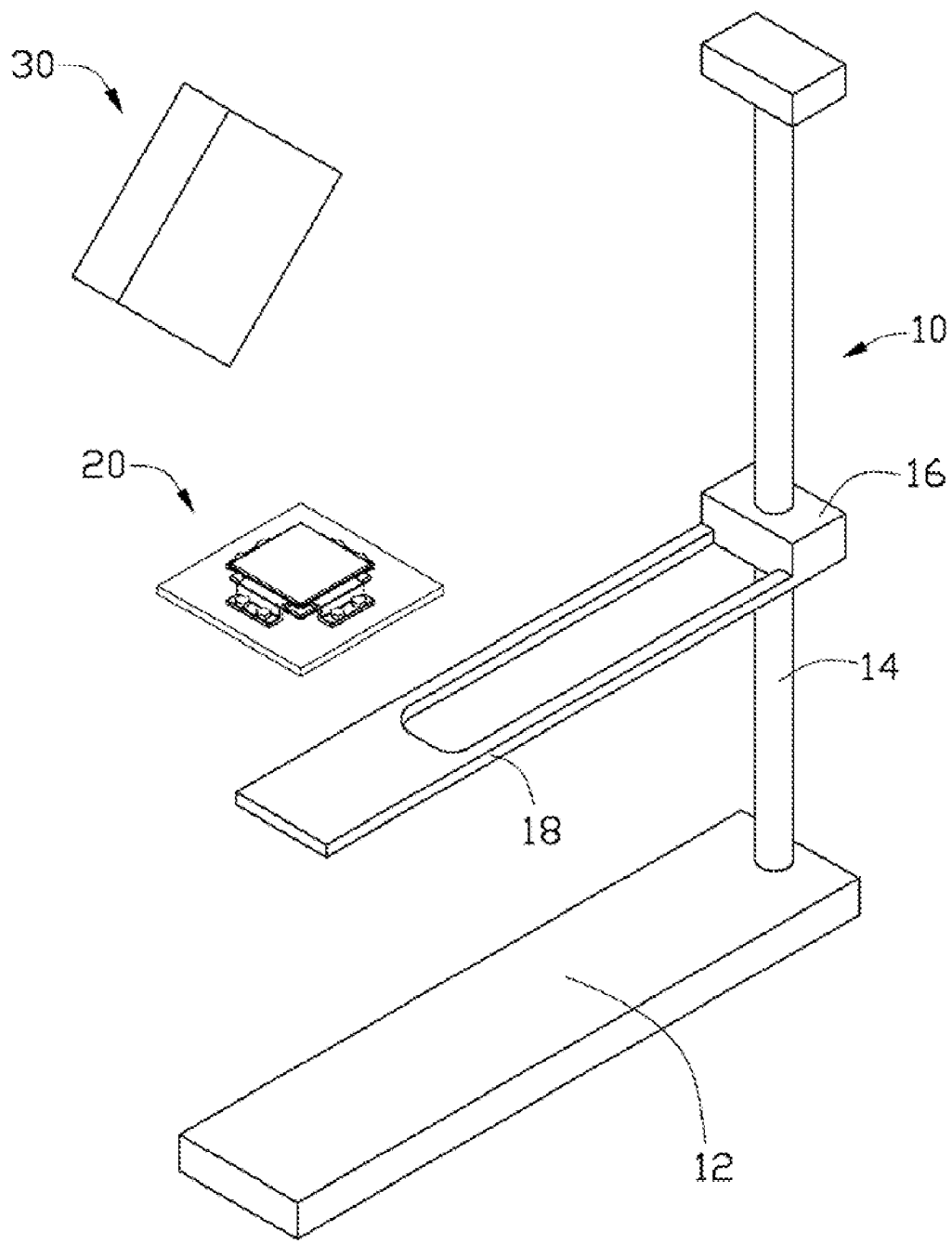
FIG. 1 is an exploded, isometric view of an embodiment of a drop test device.

Referring to FIG. 1, a drop test device for testing whether a gravity line of an object 30 deviates from a defined vertical orientation includes a drop machine 10 and a drop panel 20. The drop machine 10 includes a base 12 and a support pole 14 installed on the base 12. The support pole 14 has a sliding block 16 attached thereon. The sliding block 16 is capable of rotating on the support pole 14. The sliding block 16 has a support frame 18 attached thereon. The drop panel 20 is installed on the support frame 18. In one embodiment, the support frame 18 is parallel to the base 12; and the height of the sliding block 16 on the support pole 14 is adjustable as needed.

Figure 2:
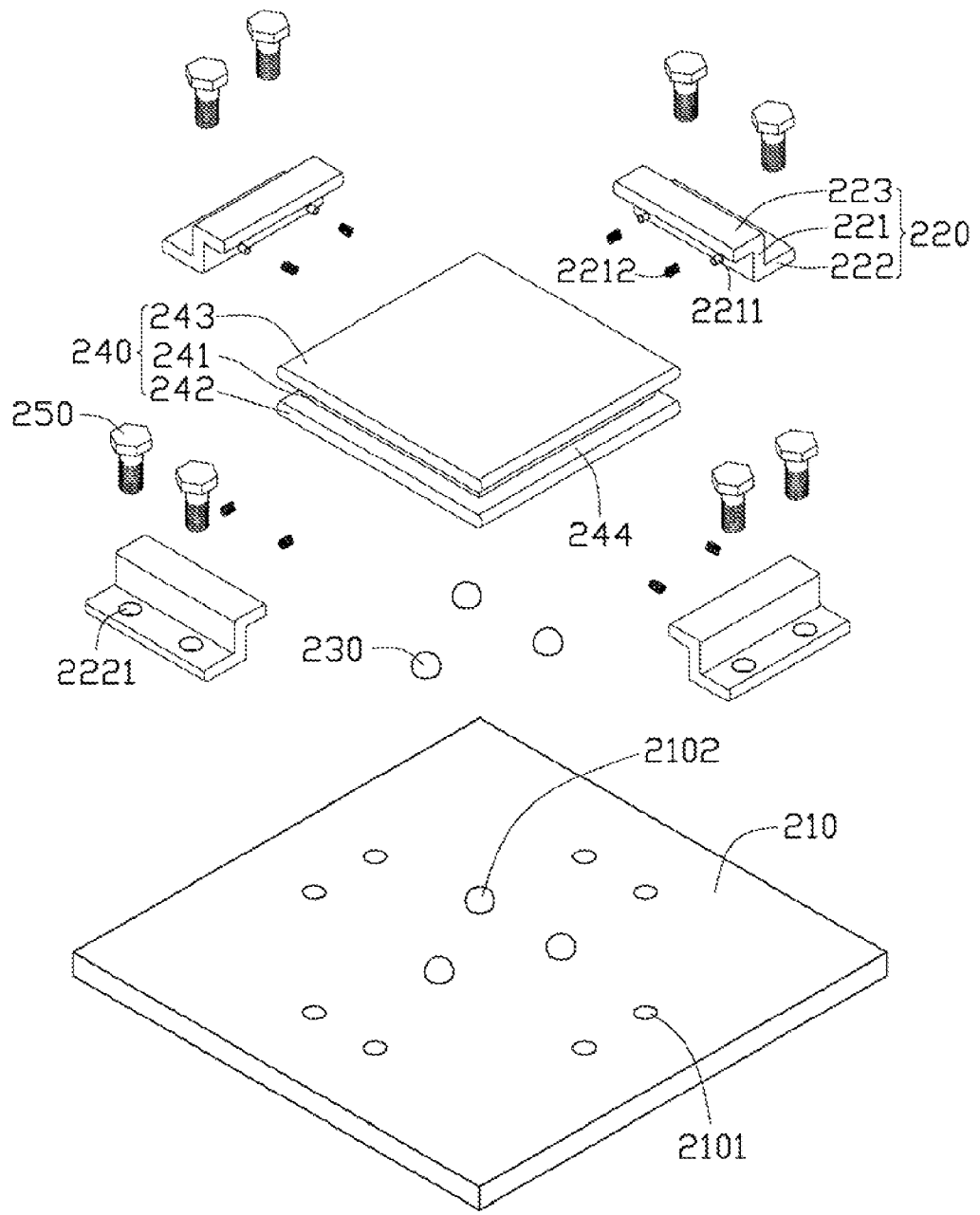
FIG. 2 is an exploded, isometric view of the drop panel of FIG. 1.

Referring to FIG. 2, the drop panel 20 includes a support board 210, a plurality of restriction boards 220 fixed on the support board 210, a plurality of balls or other rolling bearings (beads 230) mounted on the support board 210 and a sliding board 240 positioned on the plurality of beads 230 for directly receiving the impact of the object 30. The sliding board 240 is positioned between the plurality of restriction boards 220 and is capable of sliding on the plurality of beads 230. Each of the plurality of restriction boards 220 includes a connecting portion 221. A bottom wall 222 extends perpendicularly from a bottom edge of the connecting portion 221. A top wall 223 extends perpendicularly from a top edge of the connecting portion 221.

The bottom wall 222 defines a plurality of through holes 2221 thereon. The support board 210 defines a plurality of securing holes 2101 thereon corresponding to the plurality of through holes 2221. A plurality of fastening members 250 passes through the plurality of through holes 2221 and the securing holes 2101 to fix the plurality of restriction boards 220 on the support board 210. The connecting portion 221 has a triggering switch 2211 protruding therefrom. The triggering switch 2211 has a spring 2212 mounted thereon. The sliding block 16 defines a plurality of indicators (not shown) thereon which corresponds to the triggering switches 2211. When the sliding board 240 moves toward the plurality of restriction boards 220, the sliding board 240 resists the springs 2212 on the plurality of restriction boards 220 to trigger the triggering switches 2211; and the plurality of indicators on the sliding block 16 is activated to emit light.

The sliding board 240 includes a body member 241. A bottom surface 242 extends from a bottom edge of the body member 241. A top surface 243 extends from a top edge of the body member 241. A plurality of first slots 244 is formed between the bottom surface 242 and the top surface 243. The top walls 223 of the plurality of restriction boards 220 are received in the plurality of first slots 244. The support board 210 defines a plurality of second slots 2102 thereon corresponding to the plurality of beads 230. The plurality of beads 230 is received in the plurality of second slots 2102 and each of the beads 230 is capable of independently rotating on the bottom surface 242. In one embodiment, the bottom surface 242 and the top surface 243 are parallel to the support board 210.

Figure 3:
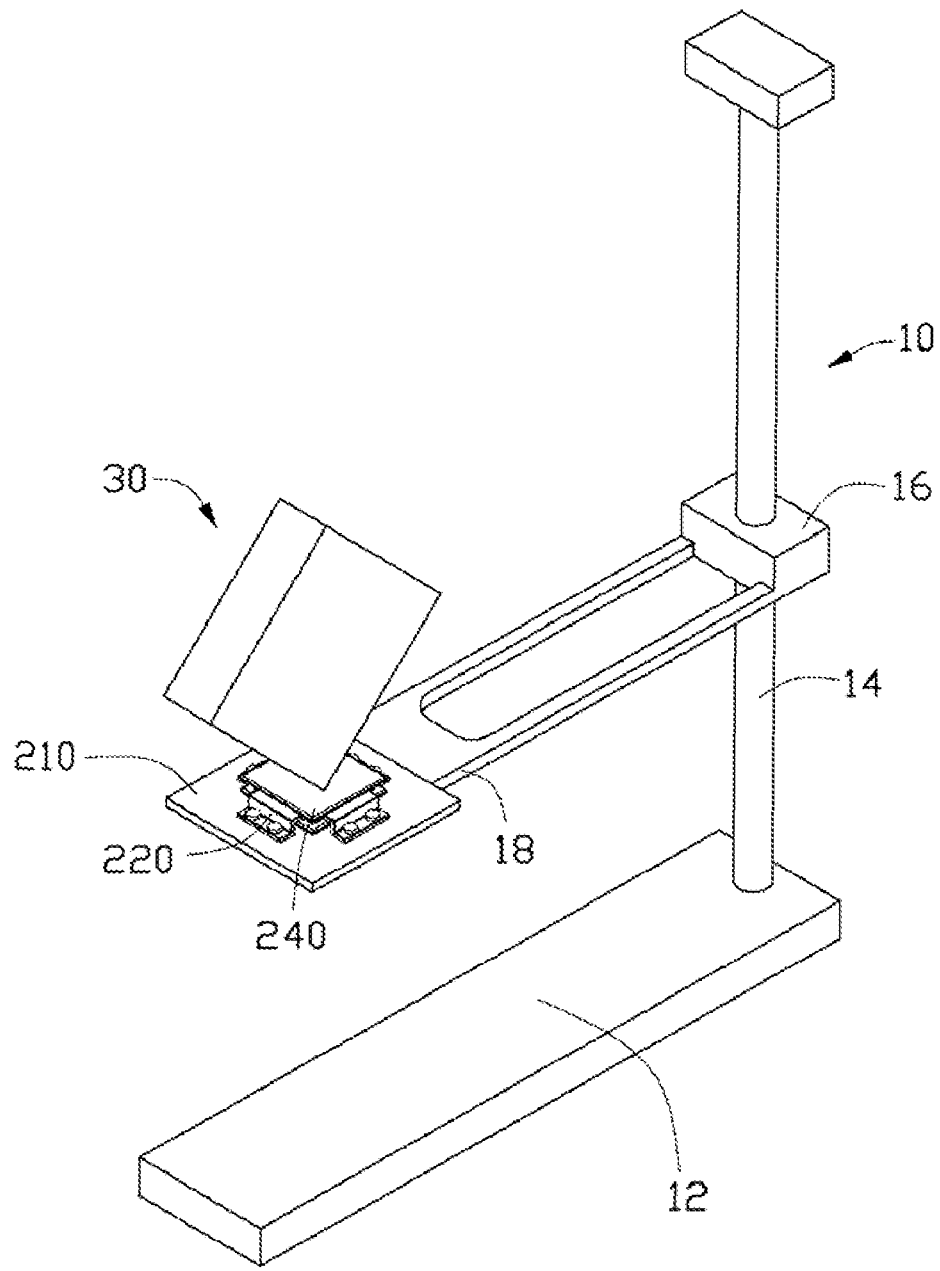
FIG. 3 is a view of the embodiment of FIG. 1 assembled.
Figure 4:
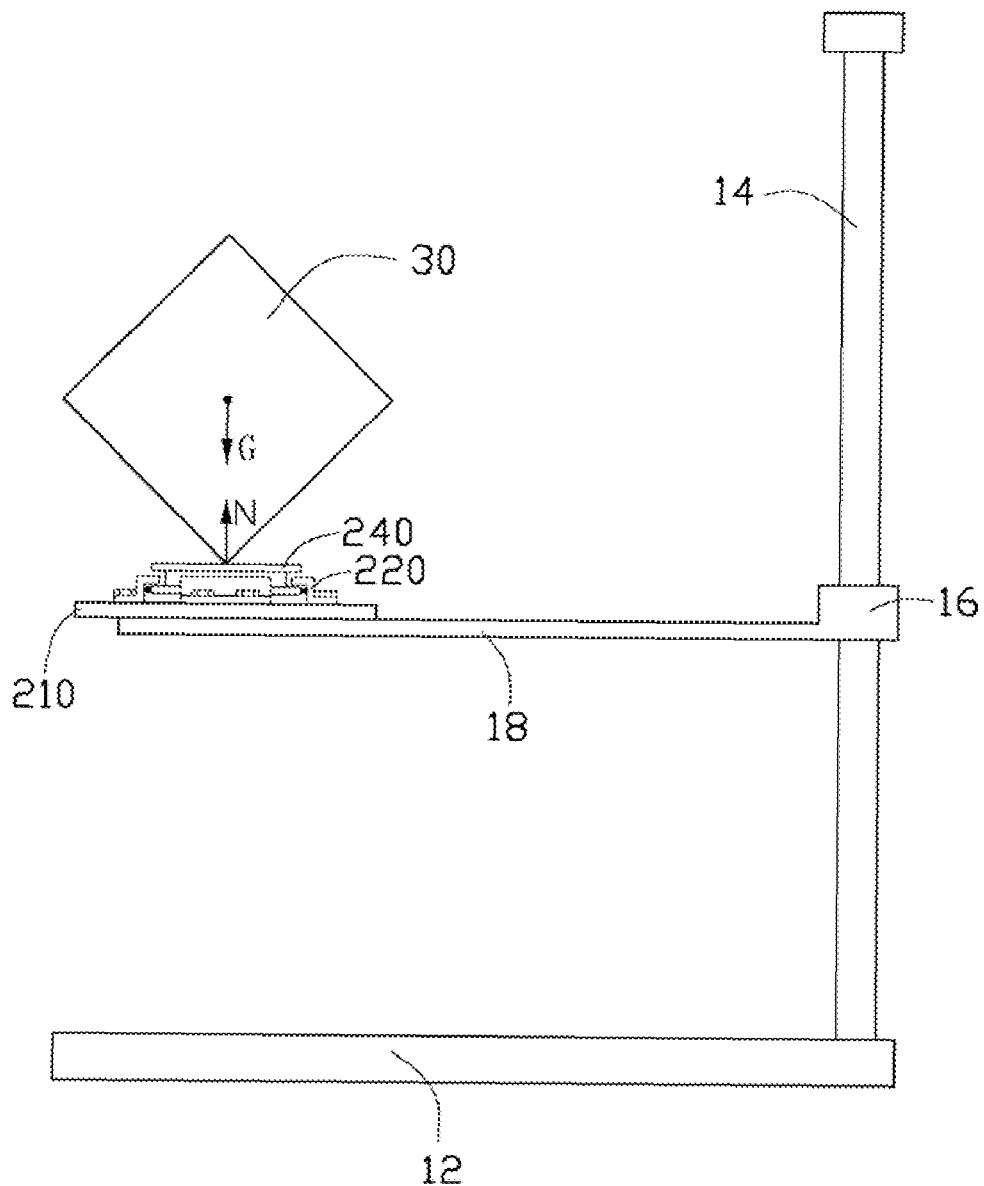
FIG. 4 is a view of the embodiment of FIG. 1 assembled, but viewed from another aspect.
Figure 5:
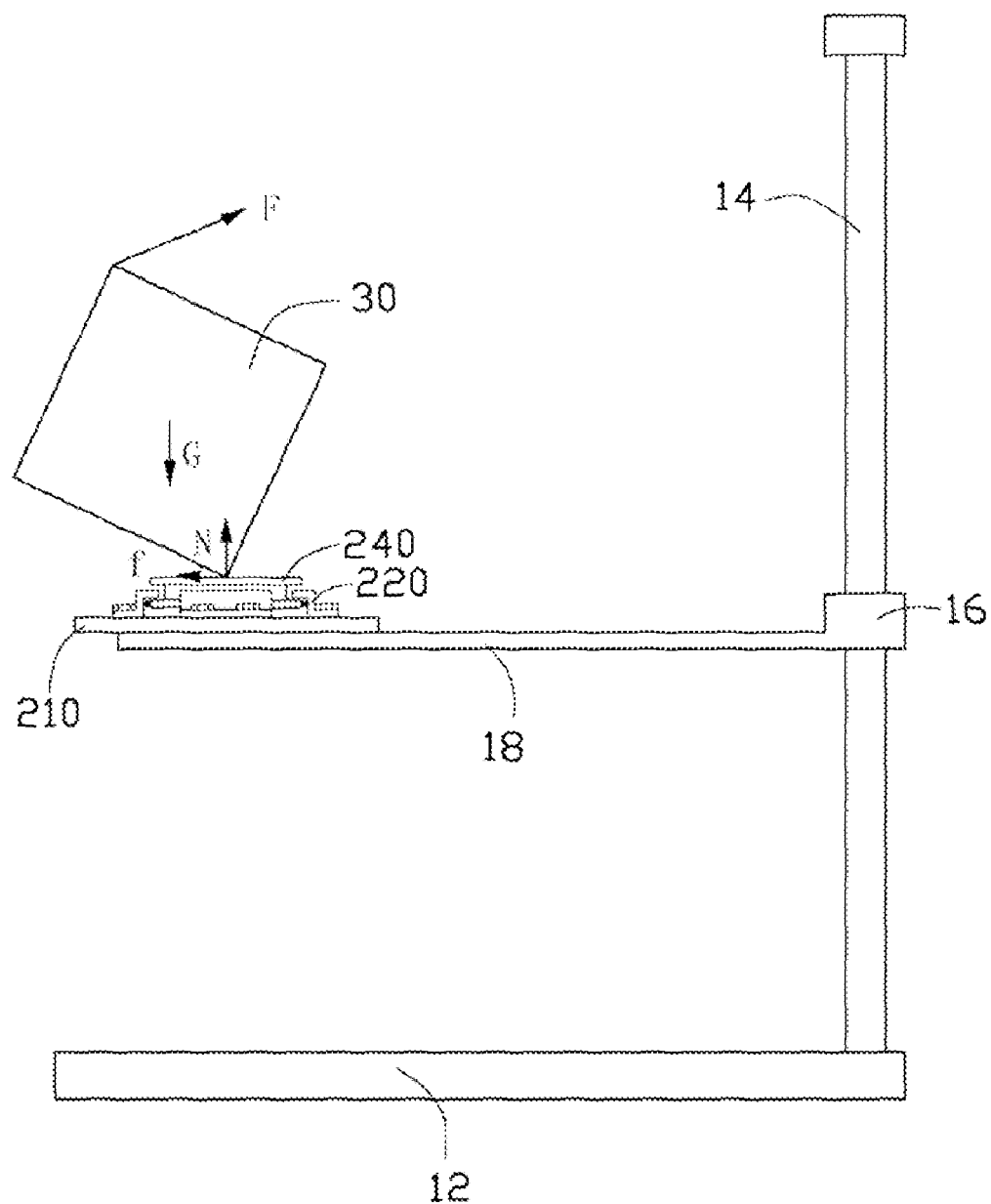
FIG. 5 is a view of the embodiment of FIG. 1 assembled, viewed from another aspect.

Referring to FIGS. 3 to 5, in assembly, the sliding board 240 is placed on the plurality of beads 230. The plurality of through holes 2221 on the plurality of restriction boards 220 aligns with the plurality of securing holes 2101 on the support board 210. The plurality of fastening members 250 passes through the plurality of through holes 2221 and securing holes 2101. The plurality of restriction boards 220 is fixed on the support board 210. The sliding board 240 is slidably fixed on the plurality of beads 230 between the plurality of restriction boards 22. The assembly of the drop panel 20 is then complete. The drop panel 20 is then fixed on the support frame 18 of the drop machine 10. In one embodiment, the sliding board 240 is stationary on the support board 210; and none of the plurality of indicators on the sliding block 16 emit light.

In a test, the object 30 is placed on the top surface 243 of the sliding board 240, the sliding board 240 is stationary on the support board 210. None of the plurality of indicators on the sliding block 16 emits light. The drop machine 10 is powered on and controls the sliding block 16 to rotate and move quickly toward the base 12. The object 30 is released from the drop panel 20 and is dropped on the base 12 to complete the test.

Then a corner of the object 30 is placed on the top surface 243 of the sliding board 240. The object 30 is held upright by an operator on the drop panel 20. If the gravity line of the object 30 is on the same line as the supportive strength line of the object 30, gravity acting on the object 30 is equal to the supportive strength on the object 30. There are no horizontal forces acting on the sliding board 240. The sliding board 240 stays motionless on the support board 210 (as shown in FIG. 4).

If the gravity line of the object 30 is not on the same line as the supportive strength line of the object 30, a diagonal force F is needed to keep the object 30 stationary on the drop panel 20. The diagonal force F has a sub-force F1 in a horizontal direction which is equal to a first friction force f1 on the object 30. There is a second friction force f2 on the sliding board 240 (as shown in FIG. 5).

The direction of the second friction force f2 is opposite to that of the first friction force f1. The sliding board 240 moves on the support board 210 under the pressure of the second friction force f2. The sliding board 240 resists the springs 2212 on the plurality of restriction boards 220 to trigger the triggering switches 2211. The plurality of indicators on the sliding block 16 emits light and indicates that the gravity line of the object 30 needs to be adjusted.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A drop test device for testing whether a gravity line of an object deviated from a defined vertical orientation, comprising:
    a drop machine comprising a base and a support pole installed on the base; and
    a drop panel installed on the support pole, comprising:
    a support board;
    a plurality of restriction boards fixed on the support board;
    a plurality of beads mounted on the support board; and
    a sliding board positioned on the plurality of beads for supporting the object; wherein the sliding board is positioned between the plurality of restriction boards and adapted to slide on the plurality of beads; if a gravity line of the object is on a same line as a supportive strength on the object, the sliding board is adapted to keep stationary on the support board; and if the gravity line of the object is not on a same line as the supportive strength on the object, the sliding board is adapted to move on the support board and trigger the plurality of restriction boards.

2. The drop test device of claim 1, wherein each of the plurality of restriction boards comprises a triggering switch thereon; the sliding block defines a plurality of indicators thereon corresponds to the triggering switches; when the sliding board is adapted to move toward the plurality of restriction boards, the sliding board is adapted to trigger the triggering switches on the plurality of restriction boards; and the plurality of indicators on the sliding block are adapted to be activated and emit light.

3. The drop test device of claim 2, wherein each of the plurality of restriction boards further comprises a connecting portion; a bottom wall perpendicularly extended from a bottom edge of the connecting portion; the bottom wall is fixed on the support board; the triggering switch is protruded from the connecting portion; each of the triggering switches has a spring mounted thereon; when the sliding board is adapted to move toward the plurality of restriction boards, the sliding board is adapted to resist the springs to trigger the triggering switches on the plurality of restriction boards.

4. The drop test device of claim 3, wherein the sliding board comprises body member; a bottom surface extended from a bottom edge of the body member; a top surface extended from a top edge of the body member; a plurality of first slots are formed between the bottom surface and the top surface; each of the plurality of restriction boards further comprises a top wall perpendicularly extended from a top edge of the connecting portion; and the top walls of the plurality of restriction boards are received in the plurality of first slots.

5. The drop test device of claim 4, wherein the support board defines a plurality of second slots thereon corresponds to the plurality of beads; and the plurality of beads are received in the plurality of second slots and adapted to rotate on the support board.

6. The drop test device of claim 3, wherein the bottom wall defines a plurality of through holes thereon; the support board defines a plurality of securing holes thereon correspond to the plurality of through holes; a plurality of fastening members are adapted to pass through the plurality of through holes and securing holes to fix the plurality of restriction boards on the support board.

7. The drop test device of claim 2, wherein the support pole has a sliding block attached thereon; the sliding block is adapted to rotated on the support pole; the sliding block has a support frame attached thereon; and the drop panel is installed on the support frame.

8. The drop test device of claim 7, wherein the support frame is parallel to the base; and
    a height of the sliding block on the support pole is adjustable as needed.

9. A drop test device for testing whether a gravity line of an object deviated from a defined vertical orientation, comprising:
    a drop machine; and
    a drop panel installed on the drop machine, comprising:
    a support board;
    a plurality of restriction boards fixed on the support board;
    a plurality of beads mounted on the support board; and
    a sliding board positioned on the plurality of beads for supporting the object; wherein the sliding board is positioned between the plurality of restriction boards and adapted to slide on the plurality of beads; if a gravity line of the object is on a same line as a supportive strength on the object, the sliding board is adapted to keep stationary on the support board; and if the gravity line of the object is not on a same line as the supportive strength on the object, the sliding board is adapted to move on the support board and trigger the plurality of restriction boards.

10. The drop test device of claim 9, wherein the drop machine comprises a base and a support pole installed on the base; and the drop panel is installed on the support pole.

11. The drop test device of claim 10, wherein the support pole has a sliding block attached thereon; the sliding block is adapted to rotated on the support pole; the sliding block has a support frame attached thereon; and the drop panel is installed on the support frame.

12. The drop test device of claim 9, wherein each of the plurality of restriction boards comprises a triggering switch thereon; the sliding block defines a plurality of indicators thereon corresponds to the triggering switches; when the sliding board is adapted to move toward the plurality of restriction boards, the sliding board is adapted to trigger the triggering switches on the plurality of restriction boards; and the plurality of indicators on the sliding block are adapted to be activated and emit light.

13. The drop test device of claim 12, wherein each of the plurality of restriction boards further comprises a connecting portion; a bottom wall perpendicularly extended from a bottom edge of the connecting portion; the bottom wall is fixed on the support board; the triggering switch is protruded from the connecting portion; each of the triggering switches has a spring mounted thereon; when the sliding board is adapted to move toward the plurality of restriction boards, the sliding board is adapted to resist the springs to trigger the triggering switches on the plurality of restriction boards.

14. The drop test device of claim 13, wherein the sliding board comprises body member; a bottom surface extended from a bottom edge of the body member; a top surface extended from a top edge of the body member; a plurality of first slots are formed between the bottom surface and the top surface; each of the plurality of restriction boards further comprises a top wall perpendicularly extended from a top edge of the connecting portion; and the top walls of the plurality of restriction boards are received in the plurality of first slots.

15. The drop test device of claim 14, wherein the support board defines a plurality of second slots thereon corresponds to the plurality of beads; and the plurality of beads are received in the plurality of second slots and adapted to rotate on the support board.

16. The drop test device of claim 13, wherein the bottom wall defines a plurality of through holes thereon; the support board defines a plurality of securing holes thereon correspond to the plurality of through holes; a plurality of fastening members are adapted to pass through the plurality of through holes and securing holes to fix the plurality of restriction boards on the support board.

* * * * *